UNITED STATES PATENT OFFICE 2,496,867

3-VINYLPYRENE AND METHOD OF PREPARING THE SAME

Ralph G. Flowers, Pittsfield, Mass., assignor to General Electric Company, a corporation of New York No Drawing. Application May 13, 1948, Serial No. 26,939

3 Claims. (Cl. 260—669)

The present invention relates to vinylpyrenes, and more particularly is concerned with vinylpyrenes consisting of a pyrene nucleus to which is attached one vinyl radical, for example, 3-vinylpyrene. The invention also is concerned with methods of preparing the aforementioned compounds, which may be considered as having the following general formula:

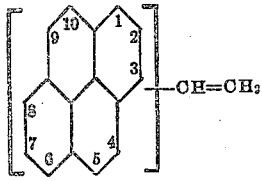

I have discovered that monovinylpyrene, for example, 3-vinylpyrene, which may be represented by the formula

I

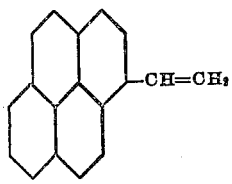

can be prepared by dehydrating an alpha-hydroxyethyl pyrene, for example, 3-(alpha-hydroxyethyl) pyrene, which may be represented by the formula

II

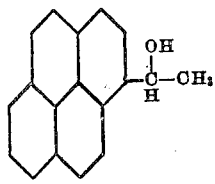

The latter compound can be prepared by reducing or hydrogenating 3-acetylpyrene under controlled reaction conditions.

In preparing the desired vinylpyrene, for example, 3-vinylpyrene, I have found it advantageous first to acetylate pyrene with an acetylating agent, for example acetic acid or anhydride, acetyl chloride or bromide, ketene, etc., to form 3-acetyl- pyrene, hydrogenating the latter to form 3-(alpha-hydroxyethyl) pyrene, and dehydrating the 3-(alpha-hydroxyethyl) pyrene to obtain 3-vinylpyrene by the removal of a hydrogen atom and a hydroxyl group from the adjacent carbon atoms of the hydroxyethyl radical.

Pyrene readily undergoes a Friedel-Crafts reaction with acetic anhydride and other acetylating agents in the presence of a Friedel-Crafts catalyst, e. g., aluminum chloride, aluminum bromide, ferric chloride, etc. The first product of the acetylization, as the reaction is generally carried out, is 3-acetylpyrene. Moreover, polyacetylpyrenes, for example, diacetylpyrenes, may be readily obtained by subjecting any monoketone isomer to further acetylization, if necessary, under more severe conditions. Thus, divinylpyrenes may be obtained from the diacetylpyrenes by employing the same method as that used for preparing the monovinylpyrenes as hereinafter described. Monoketone isomers other than 3-acetylpyrene, upon reduction to the corresponding carbinols and subsequent dehydration, yield vinyl-substituted pyrene derivatives wherein the vinyl group is present in a position other than the 3-position, the position of the vinyl group being determined by the position originally occupied by the acetyl group.

In order to facilitate control of the acetylization step, I have found it desirable to carry out the reaction in an inert solvent, i. e., a solvent which, under the conditions of reaction, is essentially inert in a Friedel-Crafts reaction. Examples of such solvents are carbon disulfide, nitrobenzene, carbon tetrachloride, etc. In general, the catalyst is dissolved or suspended in the solvent and the mixture of pyrene and the acetylating agent is then added to the catalyst solution.

The addition of reactants to the catalyst solution must be carefully controlled in order that the temperature of the reaction mixture can be maintained in the range necessary for producing the desired ketone. The acetylization is preferably carried out at a temperature of from 20° C. to 45° C. After completion of the reaction, the reaction mass is hydrogenated and the organic layer is allowed to separate. The following equation illustrates the above-described reaction when acetic anhydride is employed as the acetylating agent and aluminum chloride the Friedel-Crafts catalyst:

III

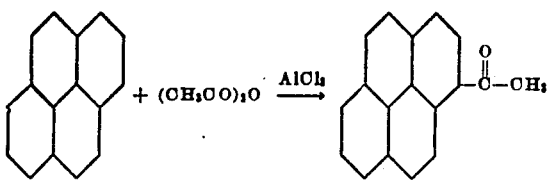

The ketone may be separated from the other products comprising the organic layer by, for example, distillation.

The next step in the preparation of monovinylpyrene is the reduction of the ketone to alpha-hydroxyethyl pyrene. This reduction may be carried out, for instance, by hydrogenating the monoacetylpyrene in the presence of a hydrogenation catalyst, for example, finely divided platinum, platinum oxide, palladium, copper chromite, etc. The hydrogenation is preferably carried out in a solvent medium such as, for example, methyl alcohol. It has been found desirable to maintain the hydrogen at superatmospheric pressure, for example, at pressures of the order of 100 to 3,000 pounds/sq. in., preferably at a pressure of about 200 pounds/sq. in. The reaction is carried out under such temperatures and for sufficient time to reduce all the ketone or ketones present in the reaction mixture. The reduction of the ketone to the carbinol under the above-described conditions may be illustrated briefly by the following equation:

IV

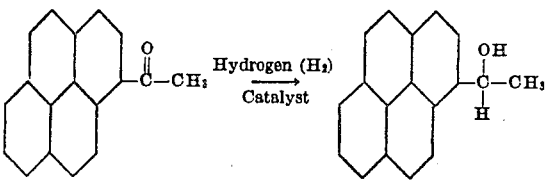

The monovinylpyrene is prepared from the alpha-hydroxyethyl pyrene by dehydrating the latter. This dehydration reaction may be carried out by reacting the carbinol with any of the usual chemical dehydrating agents such as, for instance, potassium acid sulfate, zinc chloride, phosphoric anhydride, etc. However, I have found that in the production of high boiling polynuclear vinyl compounds, such as those with which my invention is concerned, a direct vapor phase catalytic dehydration is the preferred method. This consists in dehydrating the alpha-hydroxyethyl pyrene in contact with activated alumina ($Al_2O_3$) along or with other metallic oxides, for example, oxides of chromium, tungsten, molybdenum, manganese, etc., more particularly, by passing the carbinol over the activated alumina or other vapor phase dehydration catalysts in a system which is maintained under reduced pressure, for example, a pressure of 0.1 mm. to 20 mm. mercury.

In carrying out the dehydration, the carbinol dissolved in an inert solvent (for example, an aromatic hydrocarbon solvent, for instance, benzene, toluene etc.) is fed at a carefully controlled rate to a vertical reaction column packed with catalyst pellets which is maintained at temperatures appreciably above the boiling point of the carbinol at the reduced pressure employed, for example, 340 to 360° C. In other words, the carbinol is vaporized, as it enters the reaction column and is maintained in the vapor phase in the presence of the catalyst for as long as it is necessary at such temperatures so that polymerization of the monovinylpyrene, or an undesirable condensation of the carbinol may not result. The following equation illustrates the vapor phase dehydration reaction in which activated alumina is employed as the catalyst.

V

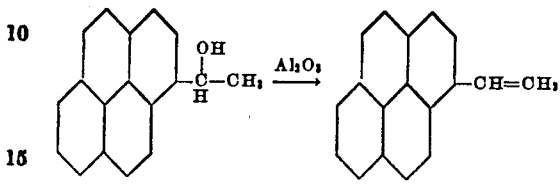

The crude product comprising the monovinylpyrene may be used as such, but preferably is purified by suitable means as, for example, by recrystallization from a solution. Alcohol and benzene have been found particularly suitable as solvents for carrying out this recrystallization.

In order that those skilled in the art may better understand how the present invention may be practiced, the following examples are given by way of illustration and not by way of limitation. The 3-acetylpyrene employed in the examples was prepared and isolated in accordance with the disclosures by Bachmann and Carmack, J. A. C. S. 63, 2498 (1941).

EXAMPLE 1

The compound, 3-acetylpyrene (M. P. 89–90° C.), in an amount equal to 108 grams, 1500 cc. absolute methanol, and 7.0 grams of copper-chromium oxide were mixed together and placed in a three-liter glass-lined hydrogenation bomb. Hydrogen was admitted until the pressure registered 200 lbs. The bomb was then heated to 200° C. for seven hours while at the same time effecting suitable agitation of the mixture in the bomb. At the end of this time the bomb was allowed to cool, the reaction mixture removed and filtered to remove the catalyst. The methyl alcohol was evaporated off and the product remaining recrystallized from benzene to yield a product having a melting point of 112–112.5° C., which was identified as 3-(alpha-hydroxyethyl) pyrene.

EXAMPLE 2

*Preparation of 3-vinylpyrene*

The 3-(alpha-hydroxyethyl) pyrene (62.0 grams) prepared above was dissolved in 200 cc. dioxane and passed dropwise down through a column packed with $Al_2O_3$ pellets while maintaining the temperature of the column at around 340 to 360° C. During the passage of the carbinol the pressure in the column was reduced to about 6 mm. with a vacuum pump. As a result of this operation, there was obtained a mass of light yellow crystals melting at 87 to 89° C. which, on analysis, were shown to consist essentially of pure 3-vinylpyrene as evidenced by the following results:

|  | Found | Theoretical |
| --- | --- | --- |
|  | *Per cent* | *Per cent* |
| Carbon | 94.4 | 94.6 |
| Hydrogen | 5.6 | 5.3 |

3-vinylpyrene may also be prepared by decarboxylating pyrenyl-3-acrylic acid by dissolving the latter in a mixture of benzene and quinoline and passing the solution through a heated column packed with copper borate-alumina pellets while maintaining the temperature of the tube at approximately 520 to 580° C. under a reduced pressure of 10 to 20 mm.

In general, the polymerization of the monovinylpyrene may be inhibited by the same compounds that inhibit the polymerization of styrene, for example, catechol, hydroquinone, etc. Such inhibitors may be washed out of the dissolved monomer with a dilute alcohol solution if desired; or polymerization may be carried out in the presence of a small amount of inhibitor at an elevated temperature, with or without a polymerization catalyst.

Monovinylpyrenes are especially suitable for use in the preparation of polymers and copolymers that are useful in various industrial applications, for example, in the plastics and coating arts, and as dielectric materials in the electrical art. They may also be employed as starting materials in the preparation of other organic compounds. The polymers and copolymers of monovinylpyrenes and methods of preparing the same are more particularly disclosed and claimed in my copending application, Serial No. 26,940 filed concurrently herewith and assigned to the same assignee as the present invention.

What I claim as new and desire to secure by Letters Patent of the United States is:

1. 3-vinylpyrene.
2. The method of preparing 3-vinylpyrene which comprises dehydrating 3-(alpha-hydroxyethyl) pyrene by removing a hydrogen atom and a hydroxyl group from the adjacent carbon atoms of the alpha-hydroxyethyl radical.
3. The method of preparing 3-vinylpyrene which comprises passing 3-(alpha-hydroxyethyl) pyrene over activated alumina thereby to dehydrate the 3-(alpha-hydroxyethyl) pyrene to form 3-vinylpyrene.

RALPH G. FLOWERS.

REFERENCES CITED

The following references are of record in the file of this patent:

Mowry et al., Jour. Am. Chem. Soc., vol. 68, 1105–1109 (1946).

Huber et al., Jour. Am. Chem. Soc., vol. 68, 1109–1112 (1946).

Bachmann et al., Jour. Am. Chem. Soc., vol. 63, 2494–9 (1941).